Aug. 22, 1950 J. J. EDWARDS 2,519,749
FRICTION DRIVE FOR GARDEN TRACTORS
Filed Aug. 5, 1946 3 Sheets-Sheet 3
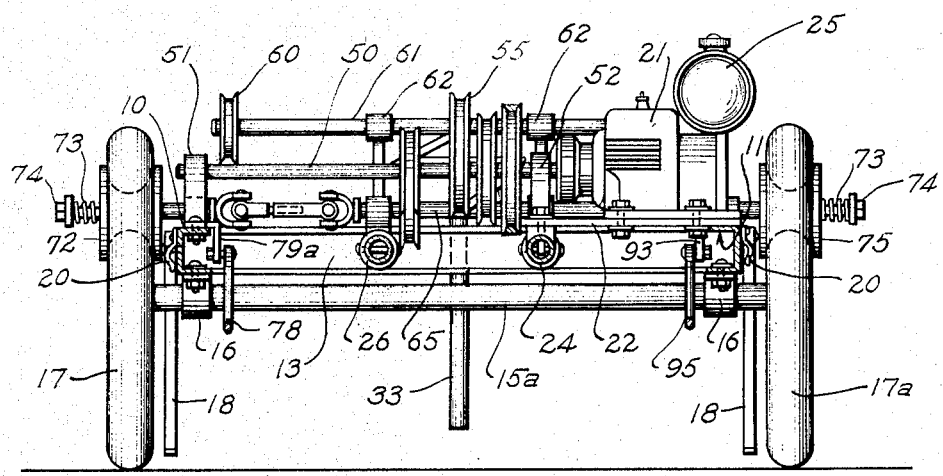
Fig. 4
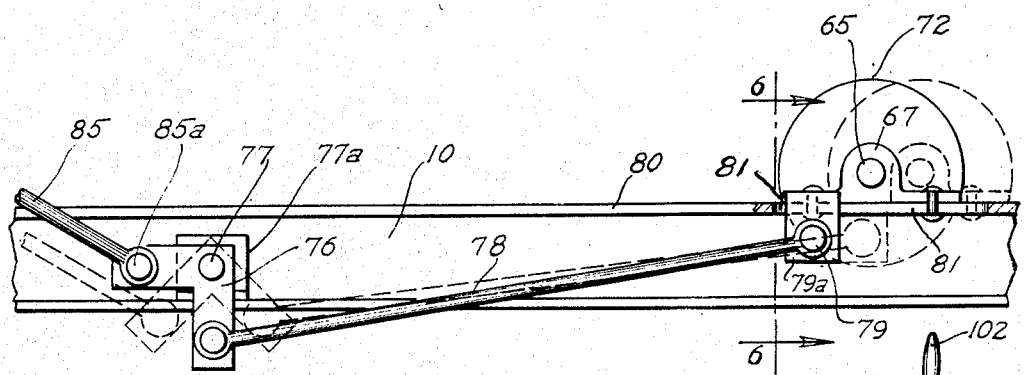
Fig. 5
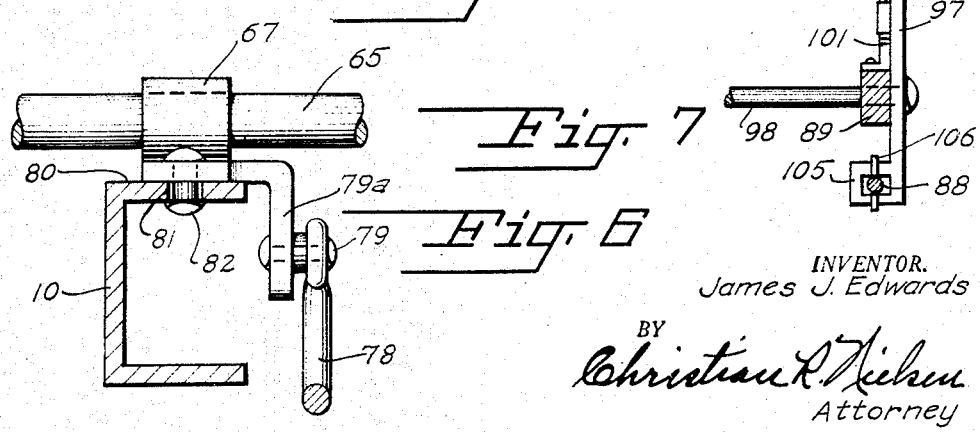
Fig. 7
Fig. 6
INVENTOR.
James J. Edwards
BY
Christian R. Nielsen
Attorney Patented Aug. 22, 1950

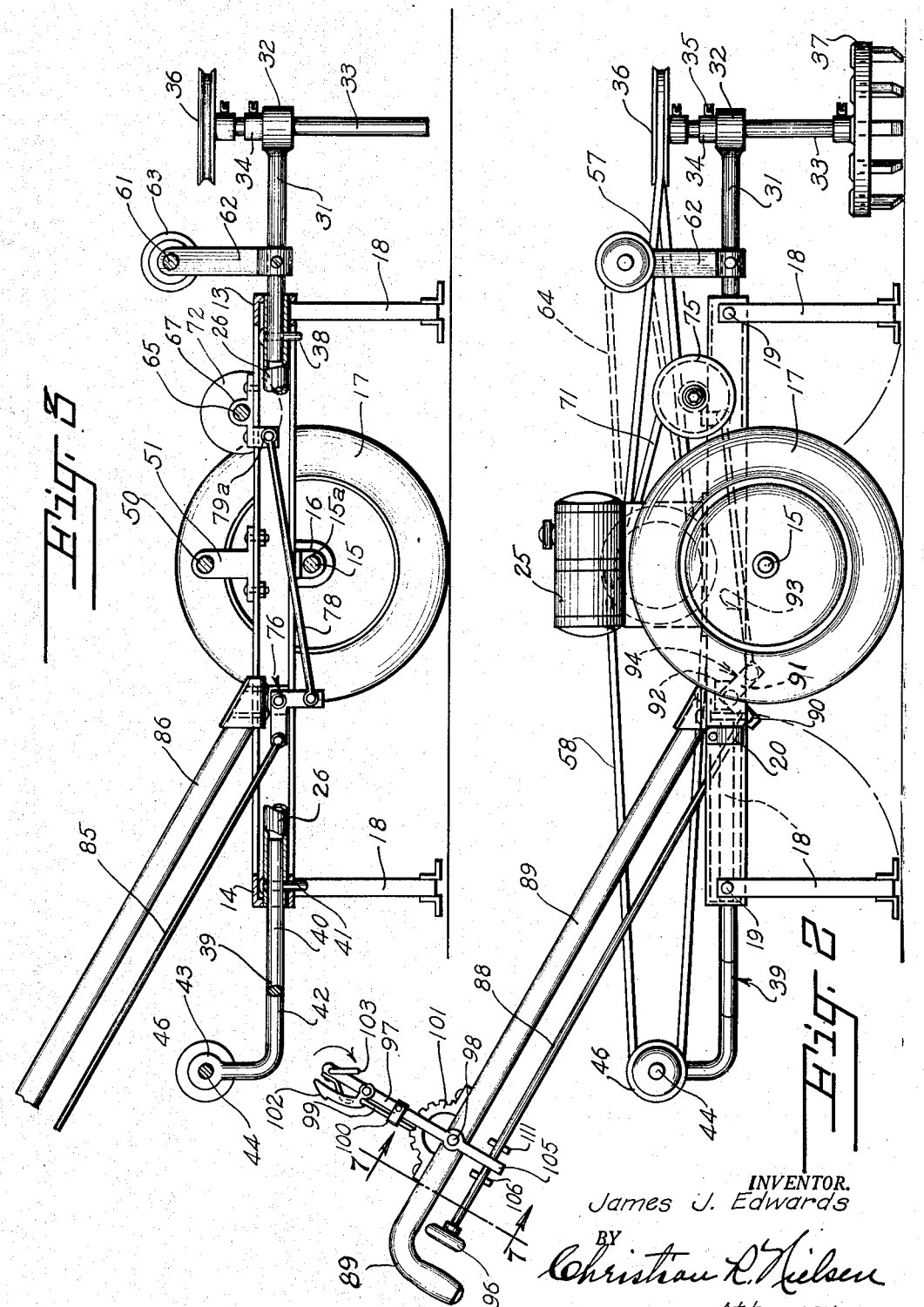

2,519,749

UNITED STATES PATENT OFFICE 2,519,749

FRICTION DRIVE FOR GARDEN TRACTORS

James J. Edwards, Siler City, N. C.

Application August 5, 1946, Serial No. 688,468

1 Claim. (Cl. 180—6.2)

This invention relates to garden tractors. An object of the invention is the provision of a tractor designed for use on small tracts of land, said tractor including a longitudinal frame to one face of which is secured a transversely disposed axle on which is mounted traction wheels, a pair of tubes being secured longitudinally to the upper or other face of the frame, a yoke having tubular arms which are received by a pair of the ends of the tubes for carrying implements or accessories, friction means rotated by a power plant on the frame and movable into engagement with the peripheries of the wheels for causing rotation of said wheels, the power plant having operative connections with the accessories for cultivating the tracts or for doing odd chores, such as operating a saw, a grinding wheel or a pump.

Another object of the invention is the provision of a simple and efficient tractor designed for use on small tracts of land, said tractor including a wheel supported frame having a pair of open-ended tubes secured longitudinally on said frame, each pair of the open ends of the tubes adapted to receive the arms of a yoke to which is attached an accessory such as a cultivator, a rake, a plow or a lawn mower, any one of said accessories being driven through operative connections with a power plant which in turn revolves the wheels carrying the frame, means being incorporated in the connections between the wheels and the power plant for varying the speed of travel of the tractor.

A further object of the invention is the provision of a practical and compact machine for doing various chores on a tract of land, said machine having a frame carried by a pair of wheels, a flexible shaft being mounted in bearings which are slidable on side bars of the frame, each bearing being under the control of the operator so that either bearing may be manually manipulated or both bearings may be simultaneously shifted to move grooved pulleys secured to the flexible shaft into operative relation with either periphery or with both peripheries of the wheels when a power plant mounted on the frame is set in operation for rotating the wheels through operative connections between the power plant and said flexible shaft.

In the drawings:

Figure 2 is a side view in elevation of the tractor shown in Figure 1.

Figure 3 is a longitudinal vertical section taken along the line 3—3 of Figure 1.

Figure 4 is a transverse vertical section taken along the line 4—4 of Figure 1.

Figure 5 is a fragmentary view of the tractor showing the mechanism for operating a sliding bearing, and Figure 6 is a transverse vertical section taken along the line 6—6 of Figure 5.

Figure 7 is a transverse vertical section taken along the line 7—7 of Figure 2.

Figure 1:
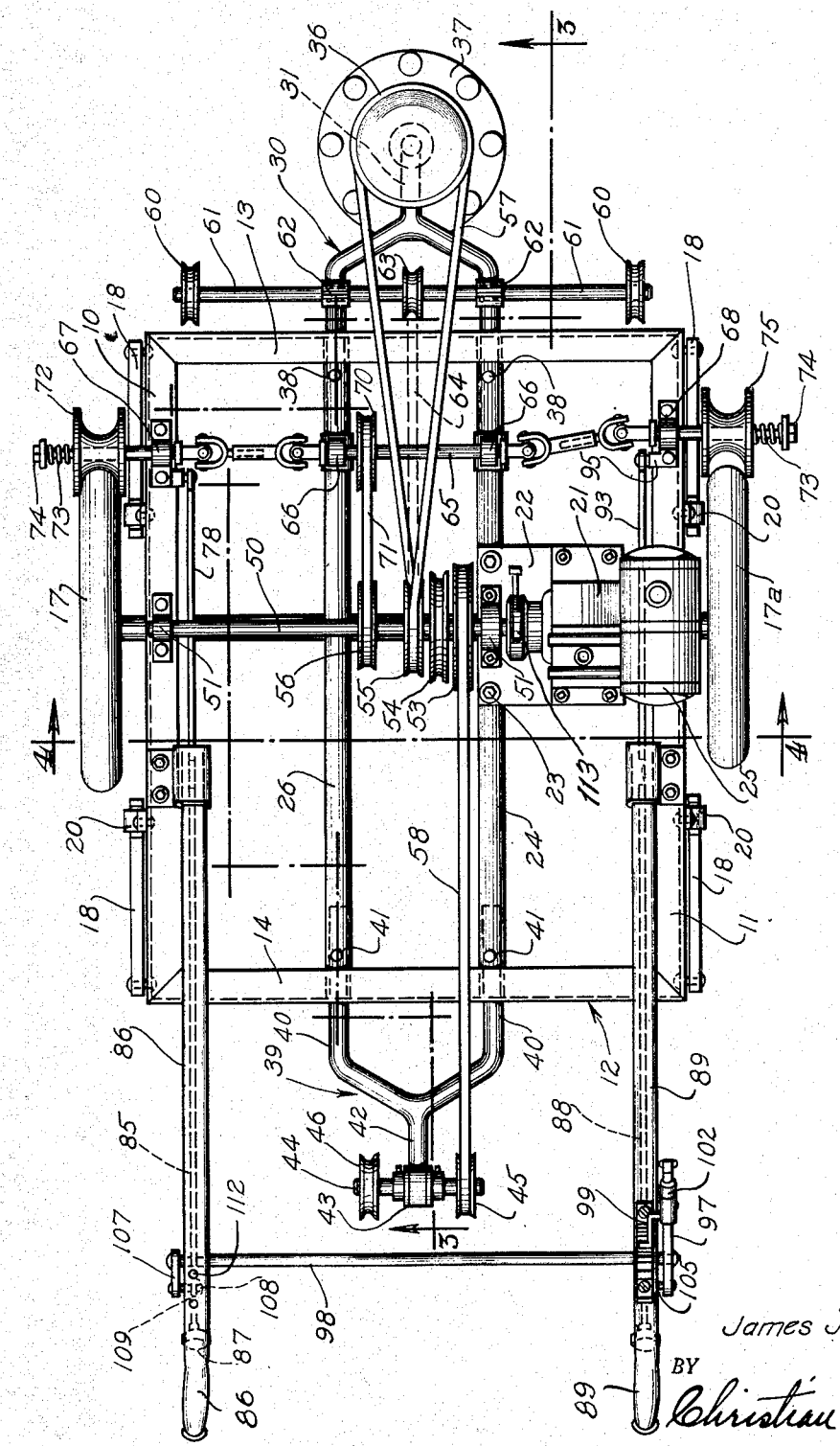
Figure 1 is a plan view of a garden tractor constructed in accordance with the principles of my invention.

Referring more particularly to the drawings, 10 and 11 designate side bars of a frame generally indicated by the numeral 12. The side bars are joined at their ends by a front end bar 13 and a rear end bar 14. All of the bars are made of channel iron.

An axle 15 is enclosed in a housing 15—a which is carried by depending brackets 16, secured to the side bars 10 and 11. Wheels 17 and 17—a, mounted on the axle, support the frame 12 above the ground.

Legs 18 pivotally mounted at 19 on the ends of the side bars aid in supporting the frame 12 in a horizontal position when the tractor is at rest or when certain accessories are employed, and when transportation is not required. A resilient clip 20 is secured on each side bar adjacent a leg for retaining each leg in an inoperative position when desired.

A power plant 21 of any well-known construction, such as an internal combustion engine, is secured to a plate 22 which in turn is attached to the side bar 11 at one end while the other end of said plate is bolted at 23 to a tube 24 welded to the opposite end bars at openings in said end bars. A fuel tank 25 is also carried by said plate.

A second tube 26 has its open ends welded to the opposite end bars at openings in said bars and in parallel relation with the tube 24. Each tube is spaced equally distant from the longitudinal center line of the frame 12.

A fork or yoke 30 has the free ends of its arms received by the open ends of the tube 24 and 26 at the front of the tractor. A bracket 31 projects forwardly of the yoke and carries a bearing 32 (Figures 2 and 3) in which is mounted a depending shaft 33. A collar 34 rests on said bearing and is secured to the shaft by a set screw 35. A pulley 36 is secured to the upper end of the shaft and is disposed in a horizontal position. Any suitable cultivator or rake 37 is removably attached to the lower end of the shaft. The arms of said yoke are held removably in place in the tubes by pins 38 or by set screws.

A second yoke 39 has its arms 40 received by the rear open ends of the tubes 24 and 26 and held removably in place by the pins 41. Set screws may be employed for the purpose as is well-known. A bracket 42 extends rearwardly from the yoke 39 and carries a bearing 43 for a shaft 44 to the ends of which are secured pulleys 45 and 46 for a purpose to be presently described.

A shaft 50 mounted in bearings 51 secured to the side bar 10 and the plate 22 is driven by the engine 21. Spaced pulleys 53, 54, 55 and 56 are secured to the shaft 50. A twisted belt 57 is trained over the pulleys 55 and 56 for rotating the implement 37 when desired. A belt 58 is trained on the grooved pulleys 45 and 53 for rotating the shaft 44 and the grooved pulley 46 from which power may be derived for operating a saw, pump or other accessory.

Pulleys 60 attached to the ends of a shaft 61 mounted in bearings 62 carried by the arms of the yoke 39 may be employed for driving accessories at the front end of the tractor. A pulley 63 at an intermediate point on the shaft 61 is driven by a belt 64 trained on the pulleys 55 and 63 when the belt 57 has been removed from the pulley 55 and the tractor is in a stationary position.

A flexible shaft generally designated by the number 65 and composed of a number of sections, has stationary bearings 66 attached to the tubes 24 and 26 and movable bearings 67 and 68 slidably mounted respectively on the side bars 10 and 11. A pulley 70 is secured to the shaft 65 and is driven by a belt 71 trained on said pulley and the pulley 56 (Figure 1).

A friction pulley 72 has a groove which neatly receives the tire on the wheel 17 at one side of the frame and is slidably keyed to one end of the flexible shaft 65. A spring 73 on said end of the shaft and disposed between a nut 74 and the hub of the pulley 72 maintains the pulley in contact with the tire of the wheel 17 so that when the shaft 65 is revolved, the pulley 72 and likewise the wheel 17 will be revolved.

A grooved friction pulley 75 is slidably keyed to the other end of the shaft 65 and a similar construction, including a spring 73 and nut 74 retain the pulley in operative relation with the tire of the wheel 17—a.

A bell crank 76 pivoted at 77 on a block 77—a secured to the inner face of the side bar 10 has an arm pivotally connected to one end of a rod 78 (Figure 5). The other end of the rod has pivotal connections 79 with a depending arm 79—a on the bearing 67 at the left hand side of the frame.

The upper flange 80 of each side bar has a slot 81 received by rivets 82 carried by the bearings 67 and 68. The heads of the rivets maintain the bearings in place.

A rod 85 pivotally connected at 85—a to the other arm of the bell crank 76 and associated with a handle 86 is adapted to rock said bell crank and shift the rod 78, which in turn causes reciprocation of the bearing 67 for moving the grooved pulley 72 into or out of operative engagement with the tire on the wheel 17. A hand grip 87 is attached to the rear of the rod 85 so that when the rod is pulled rearwardly, the grooved pulley will be moved into engagement with the tire on the wheel 17 to cause rotation of said wheel. The bell crank is pivoted.

A rod 88 associated with a handle 89 which is secured at its inner end to the side bar 11 has the inner end thereof pivotally connected to one arm 90 of a bell crank 91 that is pivoted on a block 92 secured to the inner face of the channel bar 11 of the frame (Figure 2). A rod 93 has one end pivotally attached to an arm 94 of the bell crank while the other end of the rod has pivotal connections with an arm 95 depending from the slidable bearing 68 for the shaft 65. Reciprocation of the rod 88 will shift the bearing 68. A hand grip 96 attached to the rear end of the rod 88 is provided for actuating manually said rod for reciprocating the bearing 68 to move the pulley 75 into engagement with the tire on wheel 17—a to cause rotation of said wheel independently of the wheel 17.

A lever 97 is secured to a shaft 98 mounted for rotation in the handles 86 and 89 (Figure 2). A pawl 99 slidably mounted in a guide 100 on said lever is adapted to engage the teeth of an arcuate rack 101 also mounted on said handle 89. A spring-controlled lever 102 pivoted on the lever 97 is connected to the pawl 99 and is adapted to remove the pawl from the rack 101 when actuated manually. A ring 103 engages over the hand grip for retaining the pawl in an inoperative position.

Referring more particularly to Figure 7, it will be seen that the lower free end of the lever 97 has a loop 105 which receives the rod 88 adjacent a pin 106 carried by said rod so that when the lever is rocked in the direction indicated by the arrow in Figure 2, the loop will engage the pin and force the rod 88 rearwardly to slide the bearing 68 rearwardly and move the pulley 75 into engagement with the wheel 17—a.

A lever 107 (Figure 1) has one end secured to the shaft 98 adjacent the handle 86. A loop 108 similar to the loop 105 is connected to the other end of the lever 107 and receives the rod 85. A pin 109 carried by the rod 85 is engaged by said loop when the lever 97 is rocked forwardly to draw said rod rearwardly for reciprocating the bearing 67 which action moves the pulley into engagement with the wheel 17 simultaneously with the movement of the pulley 75 for contact with the wheel 17—a. A second pin 111 is carried by the rod 88 spaced from the pin 106 with the loop 105 normally disposed midway between said pins when the lever 97 is at right angle to the arm 89 and in a neutral position (Figure 2). The rod 85 has a similar pin 112 spaced from the pin 109.

When the lever 97 is rocked rearwardly the loops 105 and 108 act on the respective pins 111 and 112 to force the rods 85 and 88 forwardly, releasing the pulleys 75 and 72. The spacing of the pins is such that the rods 85 and 88 may be actuated independently of each other.

The operation of the tractor is as follows:

A cultivator, weeder or small plow is attached to a fork similar to the fork 39. This fork, so equipped, is mounted in the rear ends of the tubes 24 and 26. At other times the rake 37 or a lawn mower may be applied to the front ends of a fork such as shown at 30.

The pulleys 60 (Figure 1) at the front end may be employed for driving a mower or other attachment. The pulley 46 may be used as a power take-off when the tractor is stationary, for operating various instrumentalities such as saws, pumps, of various kinds, or grinders.

With the lever 97 moved rearwardly and the loops 105 and 108 pressing against the respective pins 111 and 112 the tractor will remain in a stationary position. However, as soon as the lever is moved forwardly, the pulleys 72 and 75 will be drawn into operative engagement with the tire on the respective wheels 17 and 17—a and the tractor will move forwardly.

Shifting of the pulleys 72 and 75 on the ends of the flexible shaft 65 does not affect the tension of the belt 71 trained on the pulleys 56 and 70 since the central portion of the shaft is stationary in the bearings 66.

The spring 73 pressing on the pulleys 72 and 75 will cause the side surfaces of the grooved pulleys to engage completely the side surfaces of the tires for full frictional contact between said surfaces.

When it is desired to turn the tractor toward the left, the lever 97 is moved to the position shown in Figure 2, so that the loops 105 and 108 are midway between the respective pairs of pins 106—111 and 109—112, whence the rod 88 may be drawn rearwardly for causing pulley 75 to engage and rotate the wheel 17—a while wheel 17 remains idle.

When the rod 85 is drawn rearwardly with the lever 97 in neutral position (Figure 2) the wheel 17 will be rotated while the wheel 17—a will remain idle and the tractor will turn to the right.

When the lever 97 is in the neutral position shown in Figure 2, pulleys 72 and 75 are out of contact with the tire on the respective wheels 17 and 17—a. When the hand grip 87 is drawn rearwardly by the left hand of the operator, the right hand will hold the outer end of the handle 89 with the fingers of said hand being disposed between the handle 89 and the hand grip 96, so that the rod 88 cannot be moved rearwardly at this time.

The fingers on the left hand of the operator are disposed between the outer end of the handle 86 and the hand grip 87 when the member 96 is drawn rearwardly by the right hand for making a left turn.

The power plant 21 may include any conventional construction of clutch, indicated generally at 113, operable through suitable links and levers (not shown).

While I have shown and specifically described the invention, this is by way of illustration only, and I consider as my own all such modifications in construction as fairly fall within the scope of the appended claim.

I claim:

A friction drive for a garden tractor comprising a frame, a pair of wheels supporting the frame, a slidable bearing on each side of the frame, a flexible shaft mounted in the bearings, a power plant carried by said frame for rotating the shaft, a grooved friction pulley in line with each wheel and secured to the shaft, manual means for each bearing for causing shifting of the bearings independently of each other for moving a friction pulley into and out of engagement with an associated wheel, handles projecting rearwardly from the frame, a shaft carried by the free ends of said handles, an operative lever secured intermediate the ends thereof to the shaft adjacent one handle, a second lever secured to the shaft adjacent the other handle, and cooperating means between the manual means and the levers for causing simultaneous shifting of the bearings when the first lever is rocked.

JAMES J. EDWARDS.

REFERENCES CITED

The following references are of record in the file of this patent:

UNITED STATES PATENTS

| Number | Name | Date |
| --- | --- | --- |
| 583,749 | Hertel | June 1, 1897 |
| 1,005,291 | Owen | Oct. 10, 1911 |
| 1,115,854 | McDaniels | Nov. 3, 1914 |
| 1,436,373 | Walk | Nov. 21, 1922 |
| 2,176,261 | Kelsey | Oct. 17, 1939 |
| 2,250,391 | Ober | July 22, 1941 |
| 2,260,344 | Shaw | Oct. 28, 1941 |
| 2,298,054 | Howell | Oct. 6, 1942 |